United States Patent
May et al.

(10) Patent No.: US 11,448,022 B2
(45) Date of Patent: Sep. 20, 2022

(54) HIGH-INTENSITY ACOUSTIC TREATMENT OF COLLOIDAL MINERAL SUSPENSIONS FOR WELLBORE OPERATIONS

(71) Applicant: Halliburton Energy Services, Inc., Houston, TX (US)

(72) Inventors: Preston Andrew May, Porter, TX (US); Eric Benjamin Frantz, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 488 days.

(21) Appl. No.: 16/478,938

(22) PCT Filed: May 31, 2018

(86) PCT No.: PCT/US2018/035378
§ 371 (c)(1),
(2) Date: Jul. 18, 2019

(87) PCT Pub. No.: WO2019/231449
PCT Pub. Date: Dec. 5, 2019

(65) Prior Publication Data
US 2021/0404270 A1    Dec. 30, 2021

(51) Int. Cl.
C09K 8/14 (2006.01)
E21B 21/00 (2006.01)
C09K 8/16 (2006.01)
C09K 8/24 (2006.01)
C09K 8/508 (2006.01)

(52) U.S. Cl.
CPC .......... *E21B 21/003* (2013.01); *C09K 8/145* (2013.01); *C09K 8/16* (2013.01); *C09K 8/24* (2013.01); *C09K 8/5083* (2013.01)

(58) Field of Classification Search
None
See application file for complete search history.

(56) References Cited

U.S. PATENT DOCUMENTS

| | | |
|---|---|---|
| 4,371,626 A | 2/1983 | Hentz |
| 4,483,934 A | 11/1984 | Goodman et al. |
| 4,954,155 A | 9/1990 | Elrod et al. |
| 5,139,087 A * | 8/1992 | Hutchins .............. C09K 8/588 507/224 |

(Continued)

FOREIGN PATENT DOCUMENTS

| | | |
|---|---|---|
| WO | 2008052554 | 5/2008 |
| WO | 2017173207 | 10/2017 |

OTHER PUBLICATIONS

International Patent Application No. PCT/US2018/035378, International Search Report and Written Opinion dated Apr. 19, 2019, 11 pages.

(Continued)

*Primary Examiner* — Andrew Sue-Ako
(74) *Attorney, Agent, or Firm* — Kilpatrick Townsend & Stockton LLP (57) ABSTRACT

Described herein are methods of enhancing the rheological properties of a colloidal mineral suspension in a liquid with high-intensity acoustical energy. In some examples, the colloidal mineral suspension may be dehydrated after treatment with high-intensity acoustical energy.

21 Claims, 8 Drawing Sheets

(56) References Cited

U.S. PATENT DOCUMENTS

| | | | |
|---|---|---|---|
| 5,727,628 A * | 3/1998 | Patzner | E21B 37/08 |
| | | | 166/177.2 |
| 8,097,567 B2 | 1/2012 | Wilson, Jr. | |
| 9,920,604 B2 | 3/2018 | Jamison et al. | |
| 2012/0282161 A1 | 11/2012 | Abramyan et al. | |
| 2014/0090842 A1* | 4/2014 | Patil | C04B 40/0039 |
| | | | 977/762 |
| 2016/0129406 A1 | 5/2016 | Chong et al. | |
| 2016/0185608 A1 | 6/2016 | Kim et al. | |

OTHER PUBLICATIONS

Mekhamer et al., "The Colloidal Stability of Raw Bentonite Deformed Mechanically by Ultrasound", Journal of Saudi Chemical Society, vol. 14, No. 3, 2010, pp. 301-306.

Zhou et al., "Enhanced Viscosity of Aqueous Palygorskite Suspensions through Physical and Chemical Processing", Advances in Materials Science and Engineering, vol. 2015, Article ID 941580, 2015, pp. 1-7.

* cited by examiner

HIGH-INTENSITY ACOUSTIC TREATMENT OF COLLOIDAL MINERAL SUSPENSIONS FOR WELLBORE OPERATIONS

FIELD

Described herein are methods for producing colloidal mineral suspensions. The present disclosure generally relates to methods for enhancing colloidal mineral suspensions used in wellbore operations.

BACKGROUND

Colloidal mineral suspensions may be used in the drilling industry as drilling fluids. During drilling operations, a drilling fluid is generally used to cool the drilling bit, control pressure within the wellbore, and suspend and transport drill cuttings from the wellbore to the surface. Controlling or minimizing loss of drilling fluid from the wellbore into porous features of the subterranean matrix is generally desirable. The subterranean matrix may become destabilized by excessive fluid incursion and the wellbore may become compromised. Fluid loss into the subterranean matrix can usually be lessened by forming a filter cake within the wellbore. In most instances, the drilling fluid is formulated with materials that promote formation of a filter cake upon initial spurt loss of the drilling fluid to the subterranean matrix.

Some drilling fluids use bentonite or other clay derivatives to convey viscosity to the fluid and to promote formation of a filter cake during drilling. The colloidal properties of a suspension are a consideration in the selection of a colloidal mineral suspension product. Colloidal properties can include viscosity, gel strengths, yield point, tau zero, fluid loss, among others. The colloidal properties, in particular viscosity, of a drilling fluid can be modified through the addition of chemical additives. These additives are often expensive and may pose environmental concerns. A drilling fluid with increased viscosity without the addition of chemical additives may be desirable. Similarly, a drilling fluid with reduced fluid loss, increased gel strength, increased yield point and increased tau zero may be desirable and may be improved by the addition of chemical additives.

DETAILED DESCRIPTION

Certain aspects and features of the present disclosure relate to colloidal mineral suspensions and methods of making colloidal mineral suspensions. In some examples, a method for preparing a colloidal mineral suspension may include contacting a colloidal mineral with a liquid to produce a colloidal mineral suspension and applying high-intensity acoustical energy to the suspension to enhance the colloidal properties of the suspension. The method for preparing a colloidal mineral suspension may include contacting a colloidal mineral with a liquid to produce a colloidal mineral suspension and applying high-intensity acoustical energy with a power intensity of about 10 $W/cm^2$ to about 300 $W/cm^2$ to the suspension to increase viscosity, increase gel strength, reduce fluid loss, increase yield point or increase tau zero of the suspension as compared to a clay mineral suspension having high-intensity acoustical energy applied that is less than 10 $W/cm^2$ or greater than 300 $W/cm^2$ in power intensity. The method may further include dehydrating the suspension to form a dried product. In particular examples, the suspension may be utilized as a drilling fluid or an industrial slurry, such as an iron ore pelletizing slurry, a wine and juice clarifying slurry, a slurry used as an additive to foundry sand molds, an environmental containment (capping) slurry, an erosion control slurry, an asphalt emulsion slurry, a low hydraulic conductivity grouting slurry for the sealing of subterranean tubulars, and a slurry formed from mixtures of colloidal minerals and native solids for forming a slurry wall.

Colloidal properties can include viscosity (high and low end), gel strengths, yield point and tau zero (i.e., yield stress at zero shear rate), fluid loss, and synergistic interactions with additional chemical additives. Colloidal properties can describe the carrying capacity or suspension characteristics of a fluid. The viscosity of a colloidal mineral suspension may be important for some applications, such as drilling fluids where the drilling fluid helps to maintain the integrity of the wellbore and aids in drilling by transporting cuttings and cooling the drilling bit during operation. By enhancing the colloidal properties of the suspension through the application of high-intensity acoustical energy, a colloidal mineral suspension may be used in applications that generally involve higher concentrations of clays, better quality clays, the addition of property enhancing chemical additives, and combinations thereof. Potential reductions in loading levels may be advantageous to reduce cost for raw materials. Similarly, enhancing lower quality clays to achieve colloidal properties of higher quality clays may be advantageous to achieve cost reductions for raw materials. As described herein, enhanced colloidal properties can include increased viscosity, increased gel strength, increased barrel yield, increased yield point, increased tau zero, or reduced fluid loss as compared to a clay mineral suspension without application of high-intensity acoustical energy, or a clay mineral suspension having high-intensity acoustical energy applied that is less than 10 $W/cm^2$ or greater than 300 $W/cm^2$ in power intensity.

High-intensity acoustical energy can enhance the colloidal properties of a mineral through the creation of smaller particles that have more exposed surface area and more electrostatic interactions than minerals not treated with high-intensity acoustical energy. The enhanced properties may include at least one of increased thixotropy (shear thinning), increased gel strengths, improved filtrations control (i.e., better exfoliations) and greater interactions with common drilling fluid additives used to enhance these properties as compared to a clay mineral suspension without application of high-intensity acoustical energy, or a clay mineral suspension having high-intensity acoustical energy applied that is less than 10 W/cm$^2$ or greater than 300 W/cm$^2$ in power intensity.

The colloidal mineral may be selected from clay minerals, crystalline minerals and combinations thereof, for example. In some examples, the clay mineral may include bentonite, organophillic clay, a synthetic mineral such as Laponite® or other lithium sodium magnesium silicates, or combinations thereof. The crystalline minerals may include two-layer type (e.g., kaolinite, dickite, and nacrite), three-layer type (sodium montmorillonite, calcium montmorillonite, beidellite, nontronite, saponite, and hectorite), and chain-structure type (e.g., sepiolite and palygorskite/attapulgite) minerals, for example. Bentonite may include at least one of feldspar, quartz, gypsum, dolomite, illite, mica, calcite or other accessory minerals common to soil.

In one or more examples, the liquid may include water, a brine, or a liquid hydrocarbon. The water may be fresh water, seawater, or salt water, for example. The liquid hydrocarbon may be mineral oils, biodegradable esters, olefins, or other variants.

The colloidal mineral may expand when contacted with the liquid and can absorb several times its dry mass in liquid. In certain examples, the suspension may have a concentration of clay mineral in an amount ranging from about 1 pound per barrel (ppb) to about 40 ppb, about 5 ppb to about 30 ppb, or about 10 ppb to about 20 ppb. For example, the concentration may be about 1 ppb, 2 ppb, 3 ppb, 4 ppb, 5, ppb, 6 ppb, 7 ppb, 8 ppb, 9 ppb, 10 ppb, 11 ppb, 12 ppb, 13, ppb, 14 ppb, 15 ppb, 16 ppb, 17 ppb, 18 ppb, 19 ppb, 20 ppb, 21 ppb, 22 ppb, 23, ppb, 24 ppb, 25 ppb, 26 ppb, 27 ppb, 28 ppb, 29 ppb, 30 ppb, 31 ppb, 32 ppb, 33, ppb, 34 ppb, 35 ppb, 36 ppb, 37 ppb, 38 ppb, 39 ppb, or 40 ppb.

The clay mineral may be added to the liquid in a vessel in some cases. The clay mineral-liquid mixture may be mixed by methods known by one skilled in the art prior to application of the high-intensity acoustical energy or the high-intensity acoustical energy may be utilized to mix the suspension.

High-intensity acoustical energy may be high-intensity ultrasonic energy in some cases. High-intensity ultrasonic energy may be applied by high-intensity ultrasonication, for example by an ultrasonic probe. The probe may be cylindrical in shape, having a length and a substantially circular base. In particular examples, the high-intensity ultrasonication can range from power intensities in an amount from 10 W/cm$^2$ to 300 W/cm$^2$, where power intensity is the energy of the ultrasonicator divided by the area of the bottom surface of the probe. For example, the power intensity may be about 20 W/cm$^2$ to 50 W/cm$^2$, about 40 W/cm$^2$ to 80 W/cm$^2$, about 50 W/cm$^2$ to 100 W/cm$^2$, about 75 W/cm$^2$ to 150 W/cm$^2$, about 100 W/cm$^2$ to 200 W/cm$^2$, or about 150 W/cm$^2$ to 300 W/cm$^2$. The ultrasonication probe can vibrate or lengthen/contract at frequencies ranging in an amount from 18 kHz to 22 kHz. For example, the frequency may be about 18 kHz to 19 kHz, about 19 kHz to 20 kHz, or about 20 kHz to about 22 kHz. The amplitude or distance the probe can lengthen during a single vibration cycle can range in an amount from 10 microns to 200 microns. For example, the amplitude may be about 10 microns to 25 microns, about 20 microns to 40 microns, about 30 microns to 60 microns, about 50 microns to 100 microns, about 80 microns to 120 microns, about 100 microns to 150 microns, about 125 microns to about 200 microns.

The high-intensity acoustical energy may be applied to the combined clay mineral and liquid in a single pulse, in a series of pulses, or a continuous manner. When pulsed, the suspension experiences alternating sequences of applied ultrasonic energy and no energy applied. In some cases, each sequence may last from two seconds to five seconds. The alternating pulse sequences may be applied to the suspension for up to fifteen minutes, up to twenty minutes, or longer. The selection of ultrasonication power intensity may vary based on the size of the probe and/or viscosity of the colloidal mineral suspension. A larger probe diameter may require more energy to vibrate at a set frequency and set amplitude. A more viscous colloidal mineral suspension may require more energy to vibrate a probe at a set frequency, amplitude, and diameter than a less viscous colloidal mineral suspension due to the resistance caused by the more viscous suspension.

In certain examples, the high-intensity acoustical energy may cavitate the suspension, resulting in high shear as compared to a clay mineral suspension without application of high-intensity acoustical energy, or a clay mineral suspension having high-intensity acoustical energy applied that is less than 10 W/cm$^2$ or greater than 300 W/cm$^2$ in power intensity. The high intensity ultrasonication may break cementitious bonds within the clay structure that otherwise remain intact when mixing/hydrating by other means, such as with an impellor, a centrifugal pump (i.e., mud pump) or even at the drill bit. The breaking of cementitious bonds may more completely exfoliate the clays platelets leading to more clay particles with more surface area and enhanced colloidal properties. The increase in the number of smaller clay particles may enable the mineral to absorb more liquid and lead to enhanced colloidal properties and thus, a subsequent enhancement in drilling fluid properties. The enhanced colloidal properties may be retained upon dehydration of the colloidal suspension followed by rehydration in a liquid. Hydration and rehydration may include the sorption of a liquid by a colloidal mineral. Dehydration may include desorption of a liquid from a colloidal mineral.

As described herein, the method of applying high-intensity acoustical energy to a colloidal mineral suspension may increase the viscosity of the suspension as compared to a clay mineral suspension without application of high-intensity acoustical energy, or a clay mineral suspension having high-intensity acoustical energy applied that is less than 10 W/cm$^2$ or greater than 300 W/cm$^2$ in power intensity. The viscosity enhancement may be present in both the high end and low end ranges of shear rate (e.g. from 600 rpm to 3 rpm). In some cases, the increase in viscosity (cP) may be at least 200 percent greater than the viscosity of a suspension not mixed by high-intensity ultrasonication. In other cases, the increase in viscosity may be 300 percent greater than the viscosity of a suspension not mixed by high-intensity ultrasonication.

The enhanced suspension may also increase in gel strength as compared to a clay mineral suspension without application of high-intensity acoustical energy, or a clay mineral suspension having high-intensity acoustical energy applied that is less than 10 W/cm$^2$ or greater than 300 W/cm$^2$ in power intensity. In some cases, the gel strength may increase at least 200 percent, 300 percent, or more. Gel strength is a measure of the shear stress of a drilling fluid after the fluid has set quiescently for a period of time and aids in the suspension of drilled solids within the fluid column when the fluid is not being circulated.

In some cases, the fluid loss of the enhanced suspension may also be improved as compared to a clay mineral suspension without application of high-intensity acoustical energy, or a clay mineral suspension having high-intensity acoustical energy applied that is less than 10 W/cm$^2$ or greater than 300 W/cm$^2$ in power intensity. The amount of drilling fluid lost within a well through terrain voids or formation pores may be reduced with enhanced drilling fluids having increased viscosity and gel strength. Reduced fluid loss may be advantageous to lower operating costs, increase borehole stability, protect formation from fluid infiltration and fines migration, maintain fluid properties, provide a protective filter cake to the borehole, and limit potential environmental impacts of drilling the wellbore as compared to a clay mineral suspension without application of high-intensity acoustical energy, or a clay mineral suspension having high-intensity acoustical energy applied that is less than 10 W/cm$^2$ or greater than 300 W/cm$^2$ in power intensity. In some cases, the fluid loss may be at least 40 percent lower than that of a conventional colloidal mineral suspension. The fluid loss may be at least 50 percent lower or 75 percent lower than that of conventional colloidal mineral suspensions.

In some cases, the enhanced colloidal mineral suspension may have an increased barrel yield. Barrel yield is a measure of the viscosifying capability of a colloidal mineral suspension and how much drilling fluid at a specified viscosity can be produced with a given mineral suspension. As with gel strength and fluid loss, an increase in barrel yield can be advantageous to reduce operating costs by enabling a clay mineral to produce more drilling fluid at a specified viscosity when enhanced by high-intensity acoustical energy as compared to a clay mineral that is not enhanced as described herein. Without any additional viscosity extending additives, inferior grades of clay mineral (e.g., 20-80 barrel yield) may increase in barrel yield by as much as 400 percent after being subjected to ultrasonication. For higher grades of clay mineral (e.g., 80-90 barrel yield), increases by as much as 30 percent can be may be experienced with ultrasonication. In some cases, the addition of a viscosity extending additive, following ultrasonication, could produce clays with barrels yield of over 400.

Optionally, the method of enhancing a colloidal mineral suspension with high-intensity acoustical energy may further include contacting an additive with the clay mineral in the liquid prior to applying the high-intensity acoustical energy or after removing the high-intensity acoustical energy. In some cases, the additive may be sensitive to high-intensity acoustical energy, and the additive must be added after the application of high-intensity acoustical energy. For example, many polymer additives may degrade with exposure to acoustical energy at the levels described herein. Chemical additives that are "non-polymeric" or "inorganic" may be exposed to the high intensity ultrasonication and may be added before the high-intensity ultrasonication. The addition of additives to the colloidal mineral suspension subjected to high-intensity acoustical energy may produce a synergistic effect. In some cases, the enhanced properties of the suspension with additive may be greater than the anticipated increase by high-intensity ultrasonication and the anticipated increase from the additive individually. Additives may include viscosifiers, gel strength enhancers, and fluid loss additives.

Colloidal mineral suspensions may also be dehydrated for use as a liquid absorption matrix, drilling fluid, or as a mineral product. Some absorbents may use bentonite or other clay derivatives in solid form in the absorption matrix. The aggregate particle structure of the suspension can impact the absorption capacity of the clay. By modifying the structure of the colloidal mineral suspension, the enhanced absorbency and colloidal properties of the clay can be retained when dehydrated. In some examples, a method for enhancing colloidal mineral suspension may include contacting a clay mineral with a liquid to produce a colloidal mineral suspension, applying high-intensity acoustical energy to the suspension to increase the viscosity of the suspension, dehydrating the suspension to form a dried product, and milling the dried product. The milled dehydrated product may be packaged for future rehydration or for future use as a solid absorbent, drilling fluid, or mineral product. Some applications for clay-based absorption matrices can include pet litter, oil absorbent, pelletizing of iron ore, clay soil amendment, geosynthetic clay liner, and foundry molds.

Optionally, the method may further include contacting an additive with the dried product. The additive may be added to the dried product during the milling step or blended in a vessel after milling. In certain examples, the chemical additive may be a polymer. In other examples, the chemical additive may be soda ash or other modifying agent. In some cases, the method of enhancing the colloidal mineral suspension further includes rehydrating the dried clay mineral product. Conventional techniques or high-intensity acoustical energy may be used to rehydrate the dried mineral product. Modifications to the clay structure by the high-intensity acoustical energy while in suspension may be retained even when the clay is dehydrated such that upon rehydration without high-intensity acoustical energy, the clay mineral may have enhanced colloidal properties when combined with a liquid and may have increased absorption when used in a solid state or a rehydrated suspension.

In some cases, an ultrasonicator may be configured to apply high-intensity acoustical energy to increase the viscosity of a suspension comprising a liquid and a clay mineral. The high-intensity acoustical energy may be applied in pulses or continuously to the suspension. The ultrasonicator may be an ultrasonic probe. The probe may be cylindrical in shape, having a length and a substantially circular base. In some examples, the ultrasonicator may have a power intensity of about 10 to 300 W/cm$^2$. For example, the power intensity may be an amount ranging from about 20 W/cm$^2$ to 50 W/cm$^2$, about 40 W/cm$^2$ to 80 W/cm$^2$, about 50 W/cm$^2$ to 100 W/cm$^2$, about 75 W/cm$^2$ to 150 W/cm$^2$, about 100 W/cm$^2$ to 200 W/cm$^2$, or about 150 W/cm$^2$ to 300 W/cm$^2$. The ultrasonicator may vibrate or lengthen/contract at frequencies in an amount ranging from 18 kHz to 22 kHz. For example, the frequency may be an amount ranging from about 18 kHz to 19 kHz, about 19 kHz to 20 kHz, or about 20 kHz to about 22 kHz. The amplitude or distance the probe can lengthen during a single vibration cycle can range from 10 microns to 200 microns. For example, the amplitude may be an amount ranging from about 10 microns to 25 microns, about 20 microns to 40 microns, about 30 microns to 60 microns, about 50 microns to 100 microns, about 80 microns to 120 microns, about 100 microns to 150 microns, about 125 microns to about 200 microns.

In some examples, a system may include a source of high-intensity acoustical energy configured to apply high-intensity acoustical energy at frequency ranges in an amount from about 18 kHz to about 22 kHz (e.g., from about 18 kHz to 19 kHz, about 19 kHz to 20 kHz, or about 20 kHz to about 22 kHz) to a mixture that comprises a liquid and a clay mineral to improve the colloidal properties of the mixture over the properties of the mixture prior to applying high-intensity acoustical energy. The ultrasonicator may have an amplitude in an amount ranging from about 10 to 200 microns. For example, the amplitude may be about 10 microns to 25 microns, about 20 microns to 40 microns, about 30 microns to 60 microns, about 50 microns to 100 microns, about 80 microns to 120 microns, about 100 microns to 150 microns, about 125 microns to about 200 microns.

Sources of high-intensity acoustical energy include, but are not limited to, ultrasonicators. The system may apply the high-intensity acoustical energy in pulses of varying duration and intensity. The system may apply the high-intensity acoustical energy continuously. In some cases, the system may employ multiple sources of high-intensity acoustical energy in series, in parallel, or in some combination of in series and in parallel sources. Optionally, the system may further include a drying unit configured to substantially dry the suspension and a mill configured to reduce a particle size of the substantially dried mineral. In some cases, the suspension may further include a chemical additive. Optionally, the suspension may include a polymer additive or other chemical additives.

In some cases, a mixture may include a colloidal mineral, a liquid, a chemical additive that is contacted with high-intensity acoustical energy at power intensities from about 10 to 300 W/cm$^2$ with an ultrasonication probe vibrating at 18 kHz to 22 kHz and amplitudes from 10 microns to 200 microns. The power intensity may be about 20 W/cm$^2$ to 50 W/cm$^2$, about 40 W/cm$^2$ to 80 W/cm$^2$, about 50 W/cm$^2$ to 100 W/cm$^2$, about 75 W/cm$^2$ to 150 W/cm$^2$, about 100 W/cm$^2$ to 200 W/cm$^2$, or about 150 W/cm$^2$ to 300 W/cm$^2$. The frequency may be about 18 kHz to 19 kHz, about 19 kHz to 20 kHz, or about 20 kHz to about 22 kHz. The amplitude may be about 10 microns to 25 microns, about 20 microns to 40 microns, about 30 microns to 60 microns, about 50 microns to 100 microns, about 80 microns to 120 microns, about 100 microns to 150 microns, about 125 microns to about 200 microns. The mixture may be dehydratable to form a dried product that is millable. Optionally, the mixture may be rehydrated. In certain examples, the mixture may include a polymer additive, where the polymer additive is added after the application of high-intensity acoustical energy. The mixture may have enhanced colloidal properties, including increased viscosity and increased gel strength, reduced fluid loss, increased yield point and increased tau zero as compared to a clay mineral suspension without application of high-intensity acoustical energy, or a clay mineral suspension having high-intensity acoustical energy applied that is less than 10 W/cm$^2$ or greater than 300 W/cm$^2$ in power intensity. In some examples, the mixture may have a higher viscosity or higher gel strength than mixtures of substantially similar composition prepared with an impellor, a centrifugal pump (i.e., mud pump) or even at the drill bit. In certain examples, the viscosity of the mixture may be at 200 percent greater than the viscosity of the mixture prior to applying high-intensity acoustical energy. The gel strength of the mixture may be at least 200 percent greater than the gel strength of the mixture prior to applying high-intensity acoustical energy.

Figure 1:
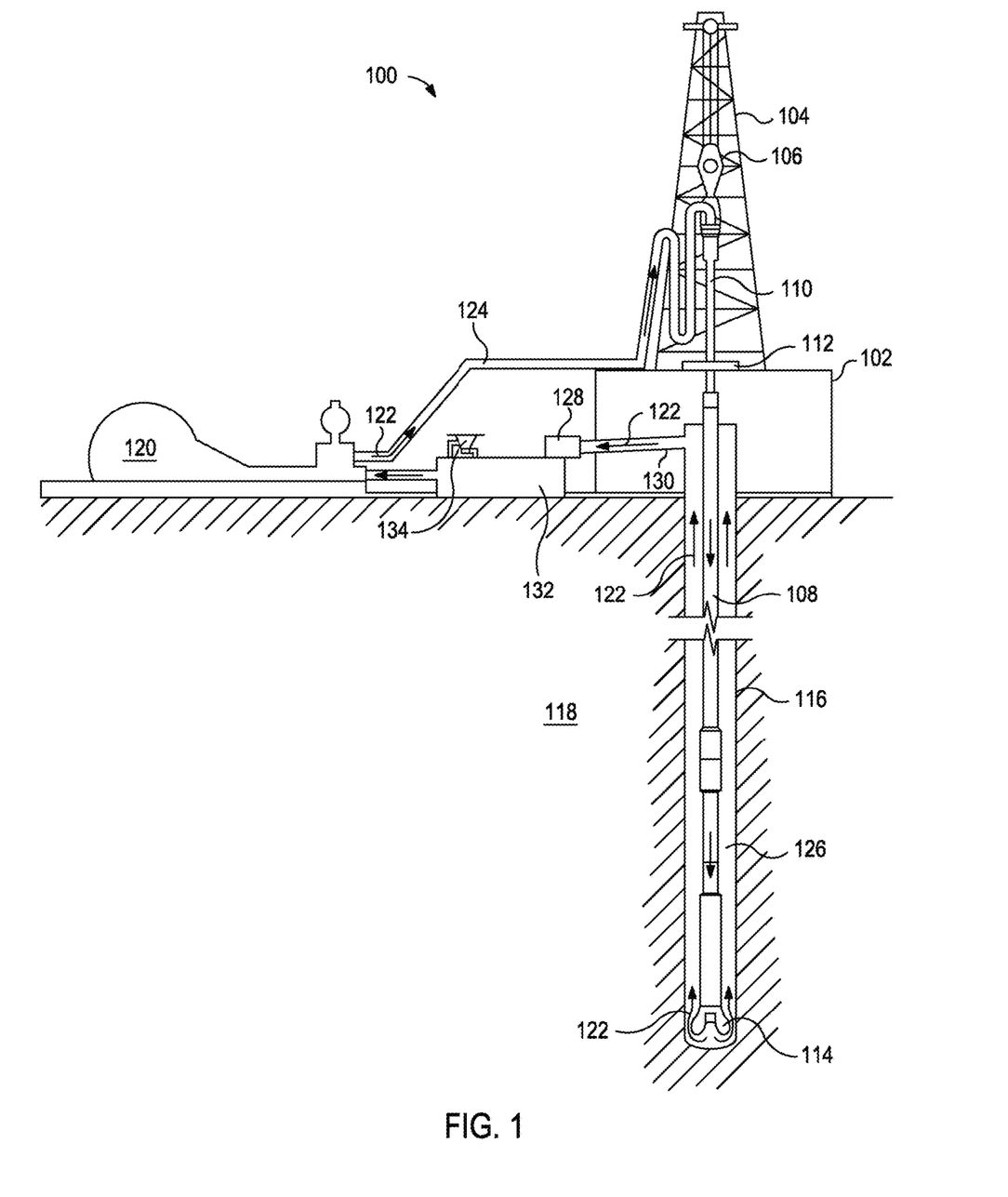
FIG. 1 is an illustrative schematic of a drilling assembly using a drilling fluid according to one or more embodiments described herein.

As shown in FIG. 1, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the wellbore 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the disclosure.

One or more of the disclosed components may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed components may be added to the drilling fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the disclosed components may be stored, reconditioned, and/or regulated until added to the drilling fluid 122.

The disclosed colloidal mineral suspension and drilling fluids may directly or indirectly affect the components and equipment of the drilling assembly 100. For example, the disclosed drilling fluids may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment. The fluid processing unit(s) 128 may further include one or more sensors, gauges, pumps, compressors, and the like used to store, monitor, regulate, and/or recondition the exemplary drilling fluids.

The disclosed colloidal mineral suspension and drilling fluids may directly or indirectly affect the pump 120, which representatively includes any conduits, pipelines, trucks, tubulars, and/or pipes used to fluidically convey the drilling fluids downhole, any pumps, compressors, or motors (e.g., topside or downhole) used to drive the drilling fluids into motion, any valves or related joints used to regulate the pressure or flow rate of the drilling fluids, and any sensors (i.e., pressure, temperature, flow rate, and the like), gauges, and/or combinations thereof, and the like. The disclosed drilling fluids may also directly or indirectly affect the mixing hopper 134 and the retention pit 132 and their assorted variations.

The drilling fluids may also directly or indirectly affect the various downhole equipment and tools that may come into contact with the drilling fluids such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed drilling fluids may also directly or indirectly affect any downhole heat exchangers, valves and corresponding actuation devices, tool seals, packers and other wellbore isolation devices or components, and the like associated with the wellbore 116. The disclosed drilling fluids may also directly or indirectly affect the drill bit 114, which may include, but is not limited to, roller cone bits, PDC bits, natural diamond bits, any hole openers, reamers, coring bits, and the like.

While not specifically illustrated herein, the disclosed drilling fluids may also directly or indirectly affect any transport or delivery equipment used to convey the drilling fluids to the drilling assembly 100 such as, for example, any transport vessels, conduits, pipelines, trucks, tubulars, and/or pipes used to fluidically move the drilling fluids from one location to another, any pumps, compressors, or motors used to drive the drilling fluids into motion, any valves or related joints used to regulate the pressure or flow rate of the drilling fluids, and any sensors (i.e., pressure and temperature), gauges, and/or combinations thereof, and the like.

Figure 2:
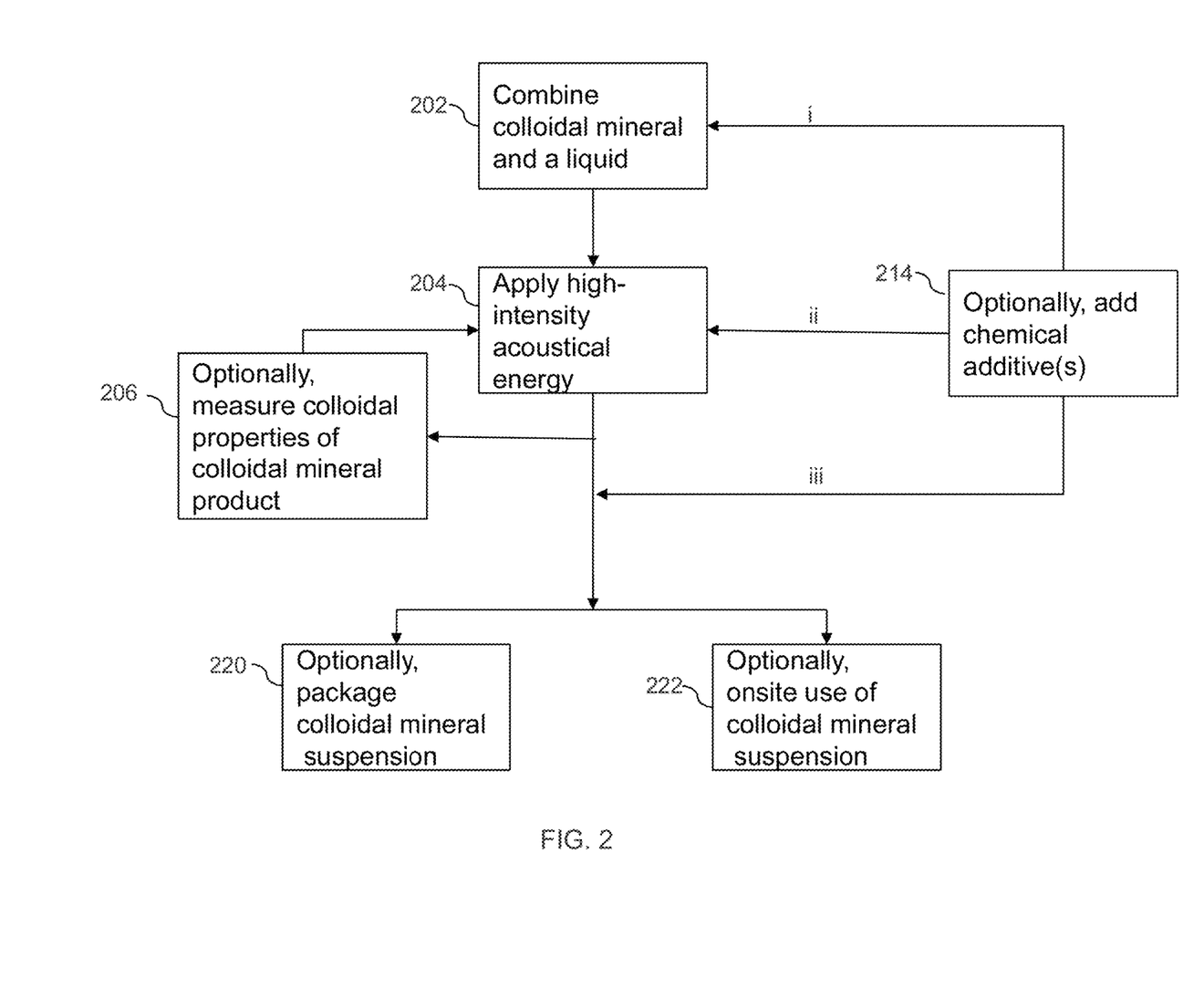
FIGS. 2 and 3 are flow-chart diagrams of a method of enhancing a colloidal mineral suspension according to one or more embodiments described herein.

FIG. 2 is a flow-chart diagram of a method of enhancing a colloidal mineral suspension according to one or more embodiments described herein. The method includes contacting a colloidal mineral and a liquid 202 and applying high-intensity acoustical energy 204 to the mixture of colloidal mineral and liquid. The colloidal properties of the colloidal mineral suspension may be measured 206 after the application of the high-intensity acoustical energy 204. Optionally, a polymer or other additive may be added 214 to the combination of colloidal mineral and liquid (i), during the application of high-intensity acoustical energy (ii), and/or after the application of high-intensity acoustical energy (iii). The suspension may be packaged 220 and/or used onsite 222.

Figure 3:
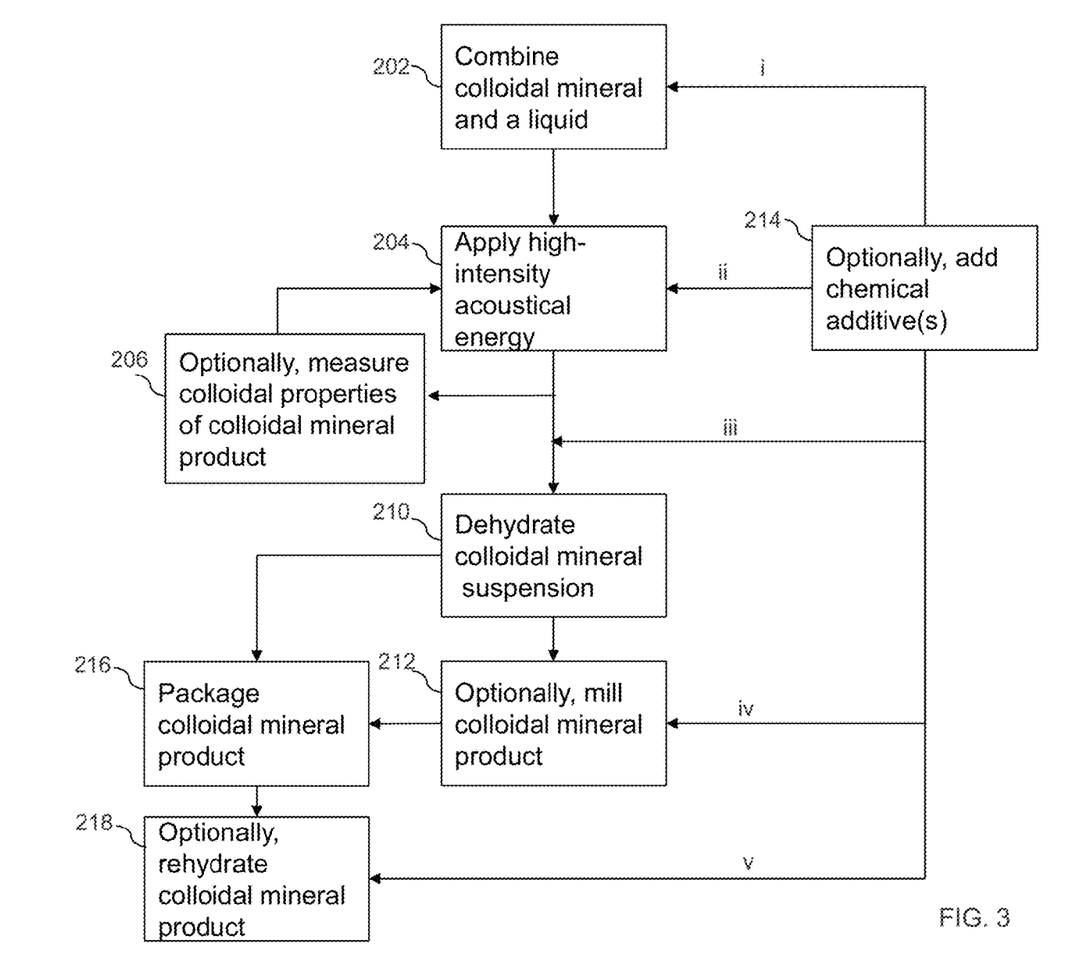

FIG. 3 is a flow-chart diagram of a method of enhancing a colloidal mineral suspension according to one or more embodiments described herein. The method includes contacting colloidal mineral and a liquid 202 and applying high-intensity acoustical energy 204 to the mixture of colloidal mineral and liquid. The colloidal properties of the colloidal mineral suspension may be measured 206 after the application of the high-intensity acoustical energy 204. In some embodiments, the enhanced colloidal mineral suspension may be dehydrated 210 and optionally milled to a specified particle size 212. Optionally, a polymer or other additive may be added 214 to the combination of colloidal mineral and liquid (i), during the application of high-intensity acoustical energy (ii), after the application of high-intensity acoustical energy (iii), during or after the milling of the dried product (iv), and/or during or after the rehydration of the dried product (v). In some cases, the dehydrated product 210 may be packaged 216. Optionally, the dehydrated product 210 may be packaged post-mill 212. In some cases, the dehydrated product 210 may be rehydrated for use 218.

EXAMPLES

Example 1: Clay Utilization Experiment

Figure 4:
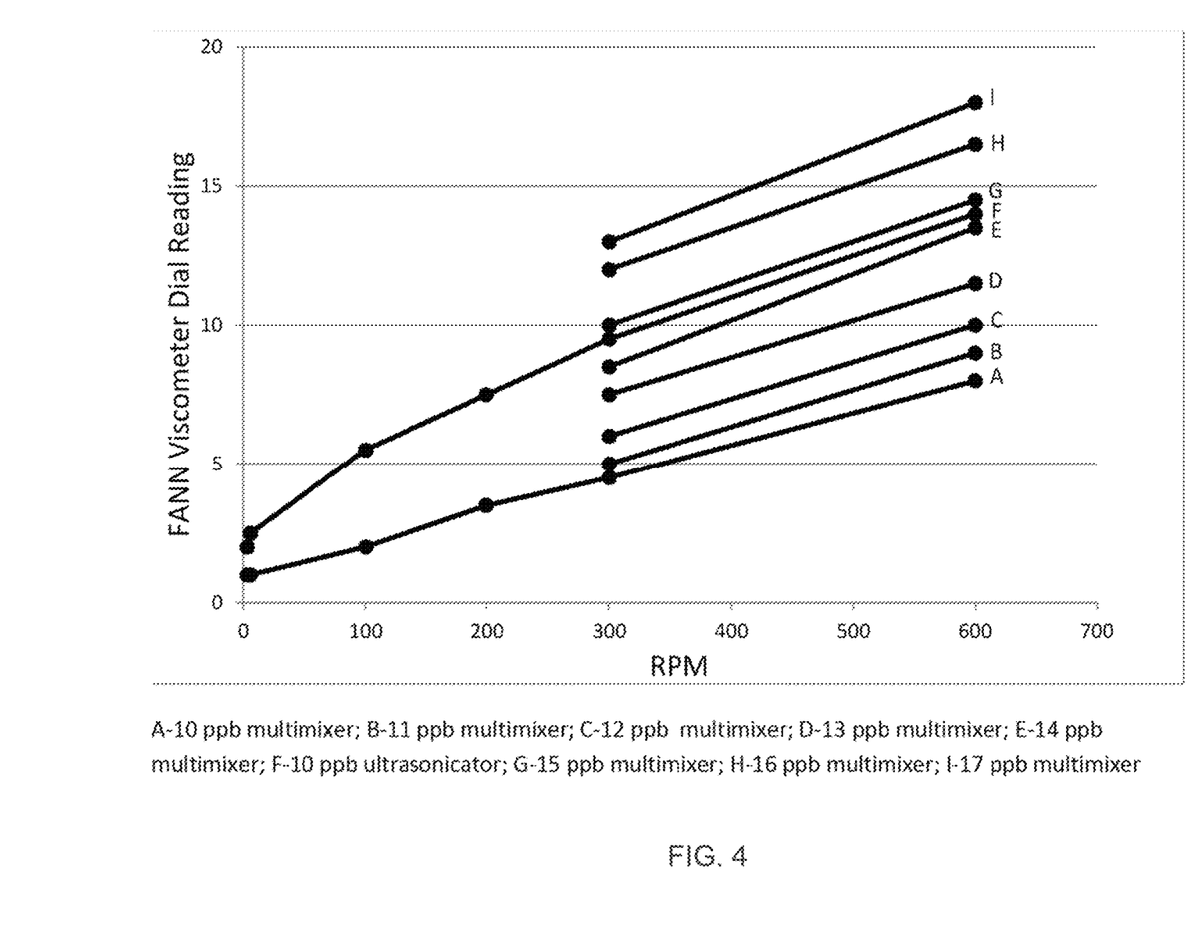
FIG. 4 is a chart of the viscosity of colloidal mineral suspensions according to one or more embodiments described herein.

Suspensions of bentonite and water were prepared at concentrations ranging from 10 ppb to 17 ppb. One group of the suspensions was mixed using a standard multimixer. One group of the suspensions was mixed with an ultrasonicator. The viscosities of all colloidal mineral suspensions were measured using a FANN® viscometer at room temperature and compared. As shown in FIG. 4, the FANN® Dial Reading increased for all suspensions as the RPM of the test was increased. Suspension F was mixed with the ultrasonicator and showed a greater increase in viscosity as compared to those mixed with the multimixer (A-E, G-I). The viscosity of the 10 ppb suspension mixed with ultrasonication (F) was approximately equivalent to the viscosity of a 14.5 ppb suspension mixed with a standard multimixer. By using high intensity acoustical energy, the suspension exhibited rheological properties of a more concentrated solution.

Figure 5:
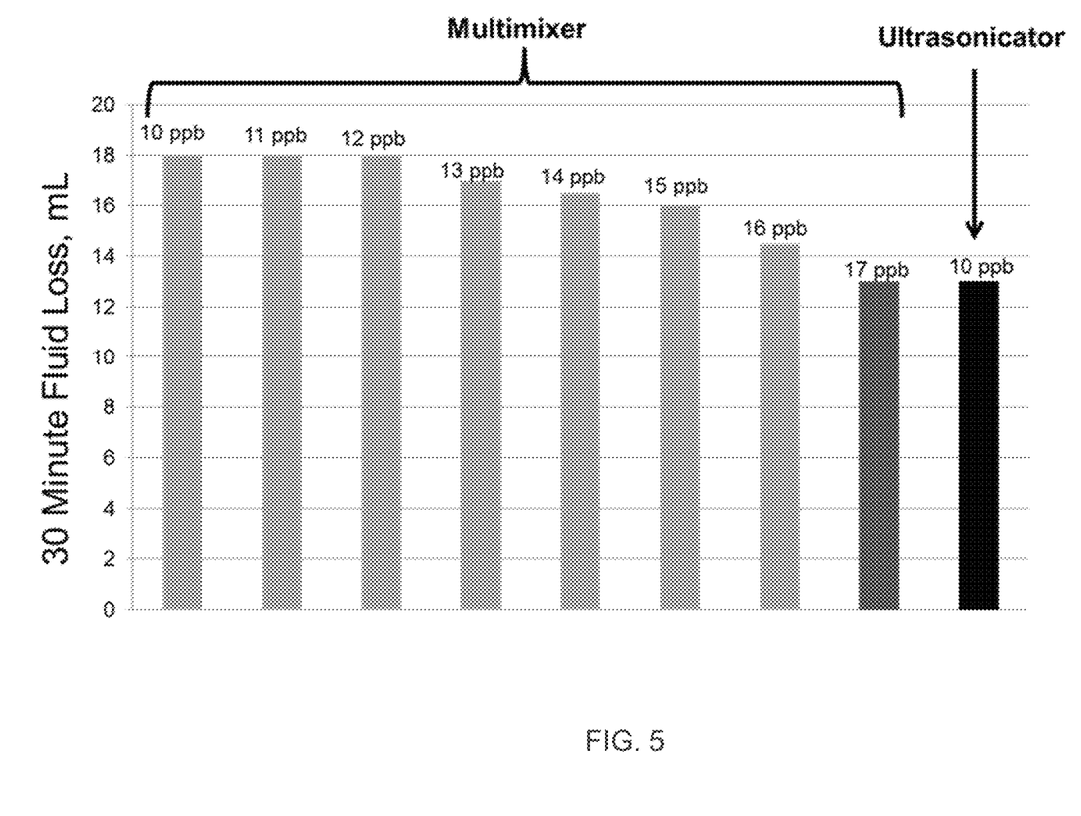
FIG. 5 is a chart of the thirty-minute fluid loss of colloidal mineral suspension according to one or more embodiments described herein.

As shown in FIG. 5, the thirty-minute fluid loss of the ultrasonicated suspension was also improved. The fluid loss of the standard multimixed suspensions decreased with increased concentrations of clay mineral, with 17 ppb demonstrating the lowest fluid loss. However, the 10 ppb suspension mixed by ultrasonication demonstrated an equivalent fluid loss as compared to the 17 ppb multimixer suspension. By using high-intensity acoustical energy, the ultrasonicated suspension exhibited fluid loss properties of a more concentrated suspension.

Example 2: Hectorite Ore Comparison

Figure 6:
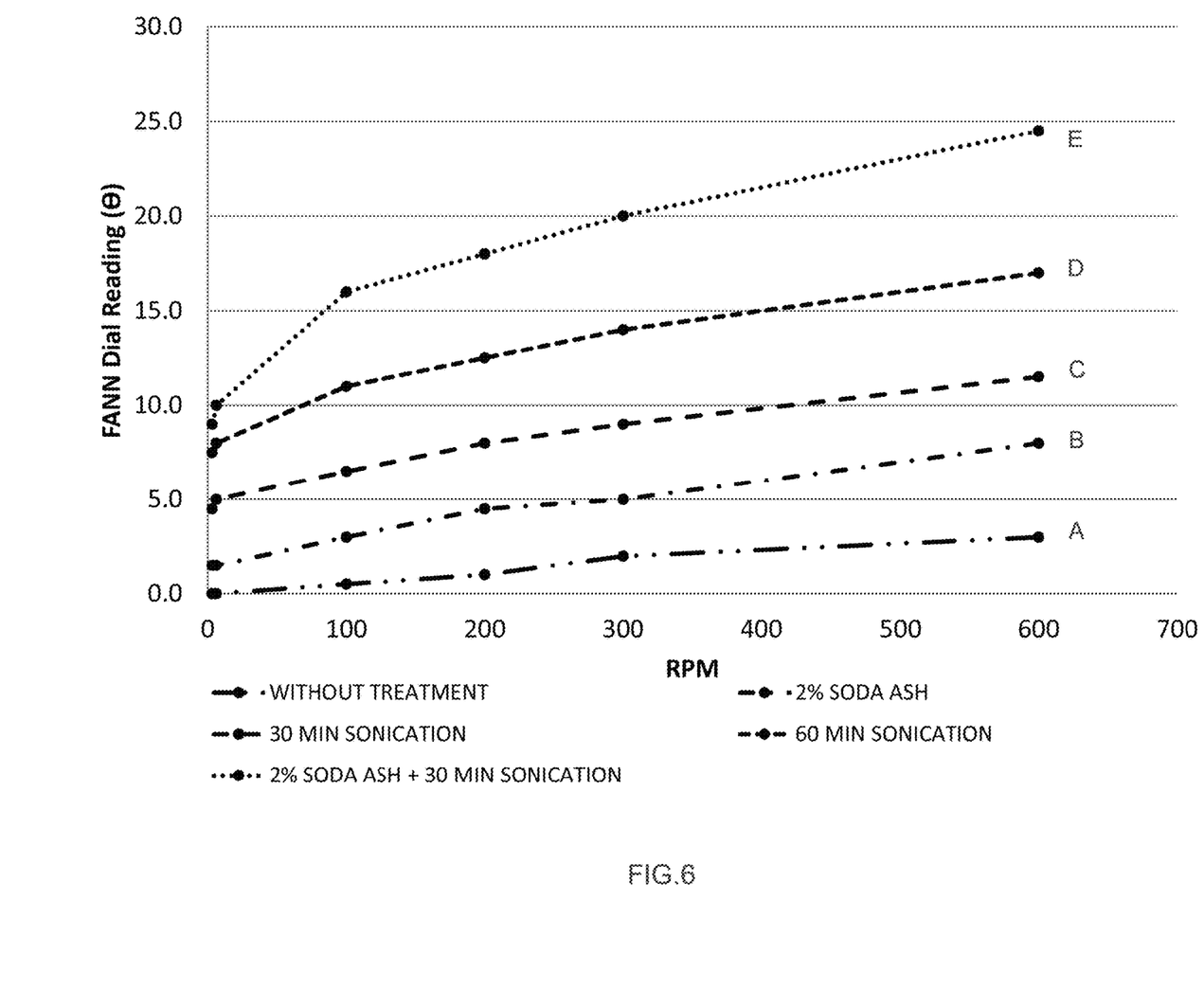
FIG. 6 is a chart of the viscosity of colloidal mineral suspension according to one or more embodiments described herein.

Suspensions of hectorite ore and water were prepared at a standard concentration and compared based on mixing method and additive content. One group of the suspensions was mixed using a standard multimixer. One group of the suspensions (A, C, D) was prepared without an additive and the method of mixing varied. Samples were mixed with a multimixer according to API Spec 13A. Thereafter, Sample C was pulsed with an ultrasonicator for 30 minutes and Sample D was pulsed with a ultrasonicator for 60 minutes. The viscosities of the hectorite suspensions were measured using a FANN® viscometer and compared. As shown in FIG. 6, the viscosity (FANN® Dial Reading) increased for all suspensions with increased RPM. The viscosity increased for the suspensions mixed by ultrasonication as compared to one prepared with the multimixer. The sample pulsed for 60 minutes by ultrasonication time (D) had a greater viscosity as compared to the 30-minute ultrasonicated sample (C) and the sample mixed by multimixer (A). The suspensions mixed with the ultrasonicator (C and D) showed an greater increase in viscosity with increasing RPM as compared to that mixed with the multimixer (A).

Samples were also prepared with 2% soda ash as an additive. As shown in FIG. 6, the viscosity of the multimixed soda ash additive sample (B) was greater than the standard multimixed hectorite suspension (A). However, both the ultrasonicated hectorite samples (C and D) exhibited a greater viscosity as compared to the soda ash multimixed sample (B). The suspension exhibiting the highest viscosity at each RPM tested was sample E, which was ultrasonicated for 30 minutes and contained 2% soda ash additive. Not only did sample E have the highest viscosity, the degree of the increase in viscosity was unexpected. The result at 600 RPM shows a synergistic effect in sample E. The increase obtained was more than the increase from the soda ash additive and the increase of the sonication method. By using high-intensity acoustical energy in conjunction with an additive, a synergistic effect may be produced and the resulting viscosity may be significantly greater compared to a standard suspension mixed with a multimixer.

Example 3: Sepiolite Mineral Suspension Enhancement

Table 1 shows suspensions of sepiolite in saturated sodium chloride water prepared by a multimixer and by high-intensity ultrasonication. The sepiolite mineral mixed by high-intensity ultrasonication displayed higher viscosity at all shear rates, higher yield point, higher tau zero, and higher gel strengths. Plastic viscosity was the only rheological parameter that did not substantially increase. The yield point increased substantially in conjunction with a relatively small change in plastic viscosity. Not intending to be bound by theory, the colloids may have been modified by ultrasonication to interact more strongly via electrostatic interactions rather than physical interactions. Additionally, the enhanced electrostatic interactions between the colloids were still observed in the saturated sodium chloride water continuous phase, which can diminish the electrostatic interactions between colloids due to high ionic content of the continuous phase.

TABLE 1

| Mixing | Multimixer | Ultrasonication |
|---|---|---|
| Saturated NaCl Water, mL | 350 | 350 |
| Sepiolite, g | 20 | 20 |
| 600 rpm | 26 | 37 |
| 300 rpm | 20.5 | 30 |
| 200 rpm | 18 | 26.5 |
| 100 rpm | 14.5 | 22 |
| 6 rpm | 8 | 14 |
| 3 rpm | 7.5 | 13 |
| Plastic viscosity, cP | 5.5 | 7 |
| Yield point, lb/100 ft$^2$ | 15 | 23 |
| $\tau_0$, lb/100 ft$^2$ | 5.3 | 11.2 |
| 10 Sec gel, lb/100 ft$^2$ | 10 | 16 |
| 10 min gel, lb/100 ft$^2$ | 16 | 20 |
| 30 min gel, lb/100 ft$^2$ | 17 | 23 |

Figure 7:
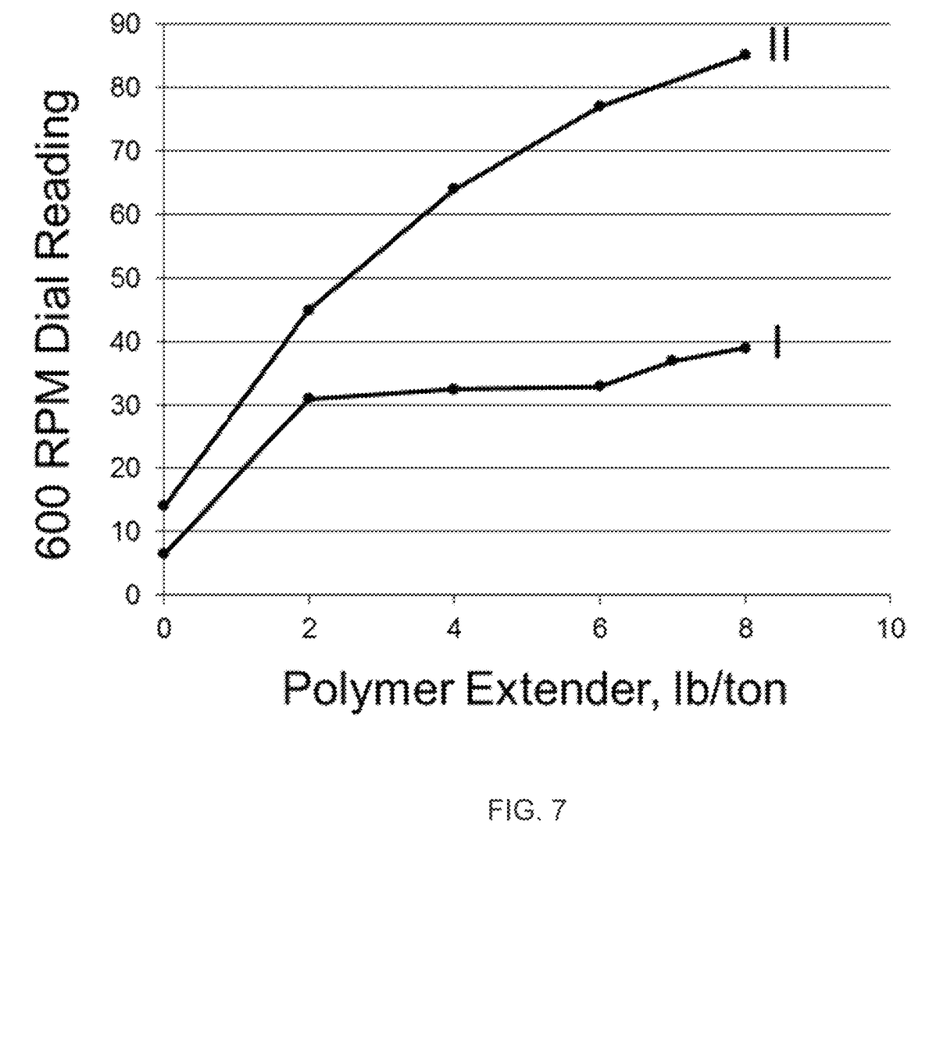
FIG. 7 is a chart of the viscosity of colloidal mineral suspension with a polymer viscosifier additive according to one or more embodiments described herein.

Example 4: Synergy Between Ultrasonically-Enhanced Bentonite and Polymer Viscosifier FIG. 7 shows the synergy between bentonite and a polymer extender, sodium polyacrylate, in a suspension where the bentonite was pre-mixed by ultrasonication. In these experiments the bentonite and water were pre-mixed with either a multimixer or ultrasonication. Following the initial pre-mix methodology, both suspensions were placed on a multimixer and dosed with polymer extender followed by viscosity measurements to observe the viscosity development with increasing concentration of polymer extender. The typical polymer response curve for a suspension of bentonite and polymer (I) plateaus from 2 to 6 lb/ton of polymer and then shows a slight increase from 6 to 8 lb/ton. By contrast, the response curve of the suspension of bentonite and polymer after ultrasonication (II) shows a continuous increase at all levels of polymer loading with no plateau present even at 8 lb/ton of polymer. The ultrasonicated clay exhibits as significantly stronger interaction with the extending polymer viscosifier after ultrasonication than with a standard multimixer.

Example 5: Synergy Between Ultrasonically-Enhanced Bentonite and Gel Strength Enhancer Table 2 shows fluid comparisons that demonstrate enhanced synergy between bentonite exposed to high-intensity ultrasonication and an inorganic gel strength enhancer, magnesium oxide. Suspensions 1 and 2 were prepared by mixing with a multimixer. Suspension 2 shows the dramatic effect of the chemical additive on the gel strengths using standard mixing methodology. Suspensions 3 and 4 were prepared by exposing the water and bentonite to high-intensity ultrasonication as a pre-mix strategy. Following the pre-mix time, both suspensions were placed on a multimixer. Suspension 3 received no addition of chemical additive, while Suspension 4 received the same concentration of chemical additive as Suspension 2. The 30-minute gel strengths demonstrate the enhanced synergy between the ultrasonically enhanced bentonite and the chemical additive. The 30-minute gel strengths improved by 44 lb/100 ft$^2$ between Suspensions 1 and 2, whereas the 30-minute gel strengths improved by 86 lb/100 ft$^2$ between Suspensions 3 and 4.

TABLE 2

| | Mixing | | | |
|---|---|---|---|---|
| | Multimixer | | Ultrasonication | |
| Suspension # | 1 | 2 | 3 | 4 |
| DI Water, mL | 350 | 350 | 350 | 350 |
| Bentonite, g | 10 | 10 | 10 | 10 |
| MgO, g | — | 0.2 | — | 0.2 |
| 600 rpm | 6.5 | 11 | 14 | 18.5 |
| 300 rpm | 4 | 8.5 | 9.5 | 13.5 |
| 200 rpm | 3 | 7.5 | 7.5 | 12 |
| 100 rpm | 2 | 6.5 | 5.5 | 9 |
| 6 rpm | 1 | 5.5 | 2.5 | 6 |
| 3 rpm | 1 | 5 | 2 | 5.5 |
| 10 Sec gel, lb/100 ft$^2$ | 1 | 11 | 3 | 12 |
| 10 min gel, lb/100 ft$^2$ | 4 | 30 | 11 | 50 |
| 30 min gel, lb/100 ft$^2$ | 6 | 50 | 14 | 100 |
| Fluid loss, 30 min, mL | 22 | 28 | 13 | 17 |

Example 6: Synergy Between Ultrasonically-Enhanced Bentonite and a Polymer Fluid Loss Additive Table 3 shows the fluid loss benefit from the synergy between an ultrasonically-enhanced bentonite and a polymer fluid loss additive, a copolymer of acrylamide and sodium acrylate. Suspension 1 was pre-mixed on a multimixer and Suspension 2 was pre-mixed by high-intensity ultrasonication. After pre-mix, both suspensions were placed on a multimixer and dosed with polymer fluid loss additive. The suspension mixed by high-intensity ultrasonication achieved an equivalent 30-minute fluid loss performance to suspension 1, but utilized 20% less concentration of both bentonite and polymer fluid loss additive. Because polymeric chemical additives are generally much more costly that mineral or clay additives, the reduced concentration of polymeric chemical additives due to the synergy between the ultrasonically-enhanced mineral and the chemical additive is highly beneficial.

TABLE 3

| | Multimixer | Ultrasonication |
|---|---|---|
| Suspension # | 1 | 2 |
| DI Water, mL | 350 | 350 |
| Bentonite, g | 10 | 8 |
| Polymer Fluid Loss Additive, g | 0.5 | 0.4 |
| 30 Min Fluid Loss, mL | 9.5 | 9.5 |

Example 7: Sonic Enhancements Retained Through the Drying Process

Figure 8:
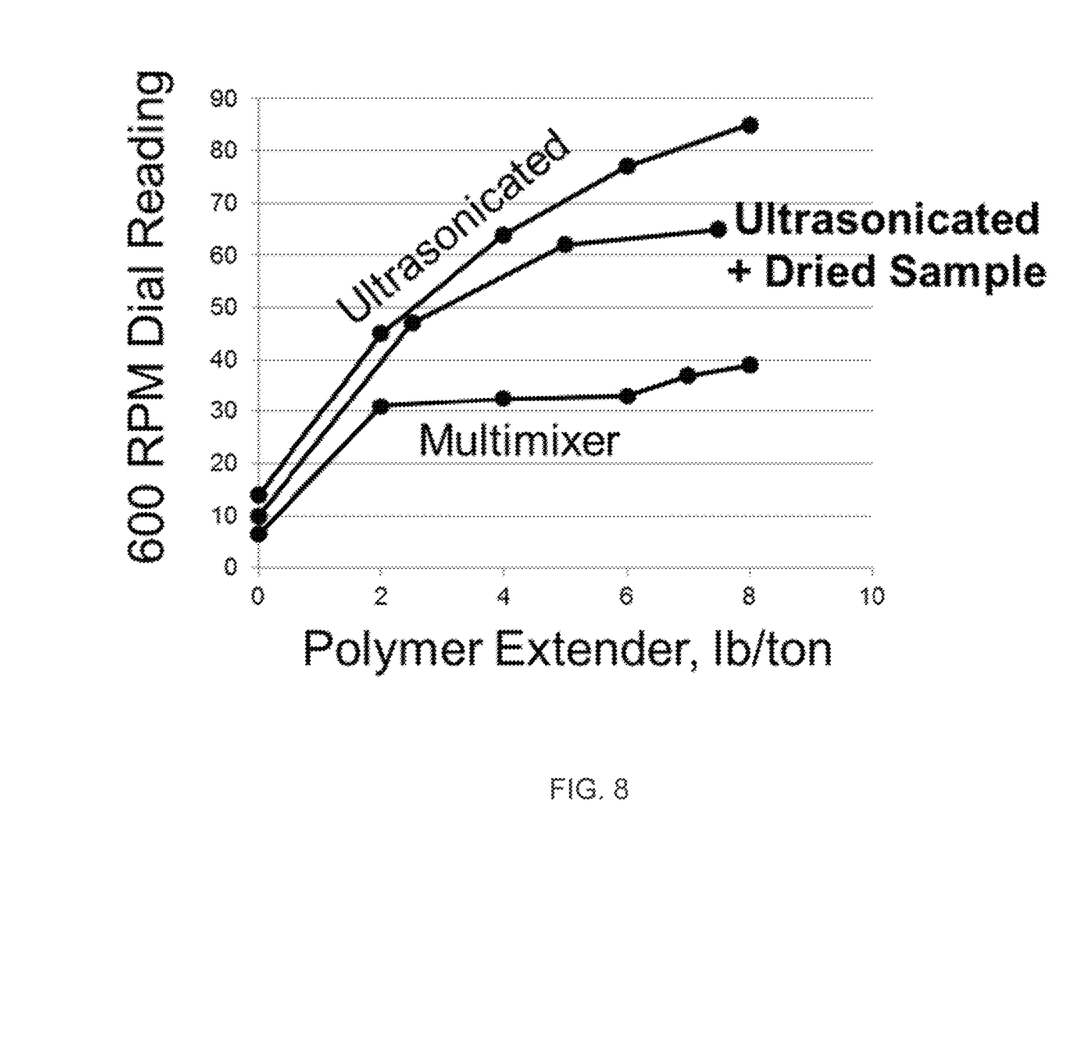
FIG. 8 is a chart of the viscosity of colloidal mineral suspension according to one or more embodiments described herein.

A suspension of bentonite and water was prepared and ultrasonicated. The suspension was dehydrated in an oven at 105° C. The dried clay product was ground using a mortar and pestle to a fine powder. The dried and milled clay product was mixed with water using a multimixer and tested for viscosity. Suspensions of equivalent concentrations of clay and polymer without dehydration were prepared for comparison. One comparison sample was mixed using a multimixer and the other was mixed by ultrasonication. FIG. 8 shows the viscosity of all the colloidal mineral suspensions. Surprisingly, the dried clay sample retained the enhancement in viscosity after dehydration and rehydration, even though the rehydration suspension was mixed by standard multimixer during the rehydration process. The suspension that was ultrasonicated and did not undergo dehydration exhibited the greatest viscosity; however, the viscosity of the dehydrated sample is substantially larger than that of the standard multimixer sample. The retained enhancement could be advantageous in the transport of improved clays to remote drilling operations by allowing the neat solid clay to be mixed on demand at the operation site and still provide enhanced rheological properties.

Illustrative Embodiments of Suitable Methods, Products, and Systems.

As used below, any reference to methods, products, or systems is understood as a reference to each of those methods, products, or systems disjunctively (e.g., "Illustrative embodiment 1-4 is understood as illustrative embodiment 1, 2, 3, or 4.").

Illustrative embodiment 1 is a method comprising: contacting a colloidal mineral with a liquid to produce a colloidal mineral suspension; and applying high-intensity acoustical energy with a power intensity of about 10 W/cm$^2$ to about 300 W/cm$^2$ to the suspension to enhance colloidal properties of the suspension.

Illustrative embodiment 2 is the method of any preceding or subsequent illustrative embodiment, wherein the suspension is utilized as a drilling fluid or an industrial slurry.

Illustrative embodiment 3 is the method of any preceding or subsequent illustrative embodiment, wherein the colloidal mineral is at least one of bentonite, sepiolite, hectorite, kaolinite, attapulgite, organophillic clay, synthetic clay, or lithium sodium magnesium silicate.

Illustrative embodiment 4 is the method of any preceding or subsequent illustrative embodiment, wherein the liquid is at least one of water, brine, or a hydrocarbon fluid.

Illustrative embodiment 5 is the method of any preceding or subsequent illustrative embodiment, further comprising contacting a chemical additive with the colloidal mineral.

Illustrative embodiment 6 is the method of any preceding or subsequent illustrative embodiment, wherein the high-intensity acoustical energy is applied at frequency ranges from about 18 kHz to about 22 kHz.

Illustrative embodiment 7 is the method of any preceding or subsequent illustrative embodiment, wherein the high-intensity acoustical energy is applied with an ultrasonication probe vibrating at amplitude ranges from about 10 microns to about 200 microns.

Illustrative embodiment 8 is the method of any preceding or subsequent illustrative embodiment, wherein the suspension has at least one of increased viscosity, increased gel strength, increased barrel yield, increased yield point, increased tau zero, or reduced fluid loss as compared to a clay mineral suspension having no high-intensity acoustical energy applied.

Illustrative embodiment 9 is the method of any preceding or subsequent illustrative embodiment, wherein the high-intensity acoustical energy cavitates the suspension.

Illustrative embodiment 10 is the method of any preceding or subsequent illustrative embodiment, further comprising dehydrating the suspension to form a dried product.

Illustrative embodiment 11 is the method of any preceding or subsequent illustrative embodiment, further comprising milling the dried product.

Illustrative embodiment 12 is the method of any preceding or subsequent illustrative embodiment, further comprising rehydrating the dried product.

Illustrative embodiment 13 is the method of any preceding or subsequent illustrative embodiment, further comprising contacting a chemical additive with the dried product.

Illustrative embodiment 14 is the method of any preceding or subsequent illustrative embodiment, further comprising contacting a chemical additive with the ultrasonicated suspension.

Illustrative embodiment 15 is a system comprising an ultrasonicator configured to apply high-intensity acoustical energy at frequency ranges from about 18 kHz to about 22 kHz to a mixture that comprises a liquid and a colloidal mineral to enhance colloidal properties of the mixture over the colloidal properties of the mixture prior to applying high-intensity acoustical energy.

Illustrative embodiment 16 is the system of any preceding or subsequent illustrative embodiment, further comprising: a drying unit configured to substantially dry the mixture; and a mill configured to reduce a particle size of the substantially dried mixture.

Illustrative embodiment 17 is the system of any preceding or subsequent illustrative embodiment, wherein the mixture further comprises a chemical additive.

Illustrative embodiment 18 is a mixture comprising a colloidal mineral and a liquid, the mixture formed by high-intensity acoustical energy applied to colloidal mineral and liquid by high-intensity ultrasonication at frequency ranges from about 18 kHz to about 22 kHz, the mixture being dehydratable to form a dried product that is millable.

Illustrative embodiment 19 is the mixture of any preceding or subsequent illustrative embodiment, wherein the mixture further comprises a chemical additive.

Illustrative embodiment 20 is the mixture of any preceding or subsequent illustrative embodiment, wherein the mixture has a viscosity at least 200 percent greater than the viscosity of the mixture prior to applying high-intensity acoustical energy.

Illustrative embodiment 21 is the mixture of any preceding or subsequent illustrative embodiment, wherein the mixture has a gel strength at least 200 percent greater than the gel strength of the mixture prior to applying high-intensity acoustical energy.

Definitions and Descriptions

The terms "disclosure," "the disclosure," "the present disclosure," "embodiment," "certain embodiment" and the like are used herein are intended to refer broadly to all the subject matter of this patent application and the claims below. Statements containing these terms should be understood not to limit the subject matter described herein or to limit the meaning or scope of the patent claims below. The terms "comprising," "having," "including," and "containing" are to be construed as open-ended terms (i.e., meaning "including, but not limited to") unless otherwise noted. It is further noted that, as used in this specification, the singular forms "a," "an," and "the" include plural referents unless expressly and unequivocally limited to one referent.

Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Additionally, any reference referred to as being "incorporated herein" is to be understood as being incorporated in its entirety.

Various embodiments of the present disclosure have been described herein. It should be recognized that these embodiments are merely illustrative of the present disclosure. Variations of those preferred embodiments may become apparent to those of ordinary skill in the art upon reading the foregoing description. The inventors expect skilled artisans to employ such variations as appropriate, and the inventors intend for the present disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated or otherwise clearly contradicted by context.

It is to be understood that the present description illustrates aspects of the disclosure relevant to a clear understanding of the present disclosure. Certain aspects of the disclosure that would be apparent to those of ordinary skill in the art and that, therefore, would not facilitate a better understanding of the disclosure have not been presented in order to simplify the present description. Although the present disclosure has been described in connection with certain embodiments, the present disclosure is not limited to the particular embodiments disclosed, but is intended to cover modifications that are within the spirit and scope of the disclosure.

What is claimed is:

1. A method comprising:
   contacting a colloidal mineral with a liquid to produce a colloidal mineral suspension;
   applying high-intensity acoustical energy with a power intensity of about 10 W/cm$^2$ to about 300 W/cm$^2$ to the suspension to enhance colloidal properties of the suspension; and
   dehydrating the suspension to form a dried product.

2. The method of claim 1, wherein the colloidal mineral is at least one of bentonite, sepiolite, hectorite, kaolinite, attapulgite, organophillic clay, synthetic clay, or lithium sodium magnesium silicate.

3. The method of claim 1, wherein the liquid is at least one of water, brine, or a hydrocarbon fluid.

4. The method of claim 1, further comprising contacting a chemical additive with the colloidal mineral.

5. The method of claim 4, wherein the chemical additive is at least one of a polymer, a soda ash, a viscosifier, a gel strength enhancer, or a fluid loss additive.

6. The method of claim 1, wherein the high-intensity acoustical energy is applied at frequency ranges from about 18 kHz to about 22 kHz.

7. The method of claim 1, wherein the high-intensity acoustical energy is applied with an ultrasonication probe vibrating at amplitude ranges from about 10 microns to about 200 microns.

8. The method of claim 1, wherein the suspension has at least one of increased viscosity, increased gel strength, increased barrel yield, increased yield point, increased tau zero, or reduced fluid loss as compared to a clay mineral suspension having no high-intensity acoustical energy applied.

9. The method of claim 1, wherein the high-intensity acoustical energy cavitates the suspension.

10. The method of claim 1, further comprising milling the dried product.

11. The method of claim 1, further comprising rehydrating the dried product to form a rehydrated product.

12. The method of claim 11, further comprising using the rehydrated product as a drilling fluid or an industrial slurry.

13. The method of claim 11, wherein the rehydrated product has at least one of increased viscosity, increased gel strength, increased barrel yield, increased yield point, increased tau zero, or reduced fluid loss as compared to a clay mineral suspension having no high-intensity acoustical energy applied.

14. The method of claim 1, further comprising contacting a chemical additive with the dried product.

15. The method of claim 1, further comprising contacting a chemical additive with the suspension after applying high-intensity acoustical energy.

16. The method of claim 1, further comprising contacting a chemical additive with the dried product.

17. The method of claim 1, further comprising using the dried product as a solid absorbent or mineral product.

18. The method of claim 1, wherein applying the high-intensity acoustical energy to the suspension comprises reducing a size and increasing a surface area of particles within the suspension.

19. The method of claim 18, wherein particles in the suspension onto which high-intensity acoustical energy has been applied have at least one of increased electrostatic interactions, increased thixotropy, increased gel strength, or improved filtrations control as compared to particles within a suspension onto which high-intensity acoustical energy has not been applied.

20. The method of claim 1, wherein applying the high-intensity acoustical energy breaks cementitious bonds within the suspension.

21. The method of claim 1, wherein dehydrating the suspension to form the dried product comprises desorping the liquid from the colloidal mineral.

* * * * *